United States Patent [19]
Caliva

[11] Patent Number: 6,016,924
[45] Date of Patent: *Jan. 25, 2000

[54] APPARATUS FOR CLEANING WATER TREATMENT TANK SURFACES

[76] Inventor: Anthony L. Caliva, 8307 Glenalta, Houston, Tex. 77061

[*] Notice: This patent is subject to a terminal disclaimer.

[21] Appl. No.: 09/028,949

[22] Filed: Feb. 24, 1998

Related U.S. Application Data

[63] Continuation-in-part of application No. 08/550,365, Oct. 30, 1995, Pat. No. 5,720,890.

[51] Int. Cl.$^7$ .................................................. B01D 12/00
[52] U.S. Cl. .......................... 210/528; 210/530; 210/541; 15/246.5
[58] Field of Search .................................. 210/525, 528, 210/529, 530, 541, 241, 800, 804; 15/246.5

[56] References Cited

U.S. PATENT DOCUMENTS

| | | | |
|---|---|---|---|
| 2,238,024 | 4/1941 | Linch | 210/529 |
| 2,261,487 | 11/1941 | Scott et al. | 210/529 |
| 4,043,920 | 8/1977 | Wooh | 210/529 |
| 4,830,748 | 5/1989 | Hall | 210/528 |
| 4,876,010 | 10/1989 | Riddle | 210/528 |
| 4,978,447 | 12/1990 | Hall | 210/530 |

*Primary Examiner*—Christopher Upton
*Attorney, Agent, or Firm*—Kenneth A. Roddy

[57] ABSTRACT

An apparatus for cleaning algae and debris from the weir, baffle, spillway, and effluent trough surfaces of a sedimentation water treatment tank. A main frame is mounted on the revolving skimmer arm of the tank. A pair of weir cleaning brushes mounted at a lower end of an articulated link arm assembly have bristles facing in inwardly opposed relation engage and clean both sides of the weir and move inward and outward relative to the center of rotation to compensate for out-of-round circular weir surfaces and pivot when their lower ends engage a bracket or obstruction so that they pass thereover and return to a vertical position. A sweeper connected with the weir cleaning brushes spans the space between the baffle and the weir and has elongate flexible strips that dislodge algae and debris and facilitate is passage through the weir and may also clean the surfaces of the baffle and weir. A vertical spillway cleaning brush and a vertical peripheral wall cleaning brush connected at the lower ends of respective support arms engage and clean the outer surface of the spillway and the inner surface of the peripheral wall and move in a horizontal inward and outward direction relative to the center of rotation of the skimmer arm to compensate for out-of-round and imperfect circular wall surfaces and pivot about a vertical axis should they contact an obstruction and then return the engaged position after passing over the obstruction.

18 Claims, 2 Drawing Sheets

APPARATUS FOR CLEANING WATER TREATMENT TANK SURFACES

CROSS-REFERENCE TO RELATED APPLICATION

This application is a continuation-in-part of U.S. patent application Ser. No. 08/550,365, filed Oct. 30, 1995 now U.S. Pat. No. 5,720,890.

BACKGROUND OF THE INVENTION

1. Field of the Invention

This invention relates generally to cleaning of sewage treatment tanks, and more particularly to an apparatus for cleaning the weir, baffle, spillway, and effluent trough surfaces of a sedimentation water treatment tank.

2. Brief Description of the Prior Art

In a typical water treatment facility, raw sewage is received from the sewage system and passed through a coarse screen to remove large pieces of matter. The sewage is next directed to one or more primary sedimentation tanks or clarifiers. The sewage remains in primary sedimentation for a period of time sufficient to allow the majority of the heavy matter to settle to the bottom of the tank, forming sludge. The sludge is removed for digestion by microorganisms and can be dried for use as compost or fertilizer. The remaining liquid is treated in a second biological system to remove ammonia. The liquid from this treatment is then aerated and passed into final sedimentation water treatment tanks to remove any remaining solid material.

Water treatment tank configurations vary with each treatment facility application. However, most final sedimentation water treatment tanks are round to eliminate inaccessible corners and provide uniform surfaces which simplifies automatic skimming, churning and/or bottom scraping operations.

In most sedimentation water treatment tanks, sediment containing water enters the central influent of the tank and the lighter clean water is continuously decanted from the heavier sediment containing water. Usually, the clean water is displaced from the tank by the constant flow of sediment containing water into the tank. The displaced clean water is forced to flow under a circular baffle plate which collects floating scum and then over a circular weir supported atop a circular spillway radially spaced a distance from the baffle plate, and ultimately enters a surronding circular clean water flow channel, also referred to as a launder channel or effluent trough which directs the water to the next treatment stage where it is further made safe to be discharged into a river or stream. Typically, the circular weir has a V-notched upper portion. An elongate skimmer arm having a depending skimmer blade revolves around the central influent portion of the tank to provide churning and prevent sludge buildup to a limited extent. Many treatment tanks have one or more vertical columns closely adjacent the spillway which support a catwalk extending horizontally over the tank. Also, in many installations the circular baffle plate is connected in spaced relation to the spillway wall by triangular gusset plates.

The exposure of water treatment tanks to direct sunlight promotes the growth of algae. Algae growth is most prevalent on the baffle, weir, spillway, and clean water channel members, and inhibits the flow of clean water from the tank. Further, the algae can be carried in thick masses and high concentrations in the clean water being discharged from the final treatment tank. Thus, the algae removing process must be done frequently, adding to the cost of operation of the facility.

Commonly, cleaning of the treatment tank is accomplished by scrubbing the baffle, weir spillway, and clean water flow channel by hand with brushes to remove the algae. This method is tedious, labor intensive, and costly.

There are several patents which disclose various algae removal and cleaning apparatus for use in sewage treatment tanks. However, most of these are relatively complex mechanisms having a system of brushes and supporting arms which are designed to simultaneously clean the inside and outside surfaces of the baffle, the inside surface of the weir, and the opposed side surfaces of the clean water flow channel.

Because most treatment tanks are quite large, usually 60 feet in diameter or more, the baffle plate, weir, spillway, and clean water flow channel or launder channel are not perfectly circular. Thus, in a single tank, there are wide variations in the radial distance from the center of the tank to the surface to be cleaned, and variations in the radial distance between the baffle plate, weir, and clean water flow channel relative to one another.

Tank cleaning devices which are connected at the outer end of the rotating skimmer arm and have a system of brushes supported on arms for simultaneously cleaning opposing surfaces of the radially spaced baffle, weir, and clean water flow channel, are difficult to adjust to maintain in constant engagement with the surfaces due to the variations in radial distance and relative spacing of these members, thus in some cases, a brush may not even be in contact with the surface along portions of its circumference, and along other portions, it may engage too tightly and cause binding.

Most prior art cleaning devices of this type are not capable of use in treatment tanks that have one or more vertical columns closely adjacent the spillway which support a catwalk extending horizontally over the tank. Also, many are incapable of cleaning the opposed surfaces and the space between the weir and baffle plate in installations where the circular baffle plate is connected in spaced relation to the spillway wall by triangular gusset plates, or else require replacement of the existng gussets with different support means.

Another disadvantage of these types of devices is that they only clean one side of the weir, not both sides, and thus, do not effectively remove algae from both sides, nor effectively prevent buildup of algae and foreign matter in the notches of weirs having notches.

Riddle, U.S. Pat. No. 4,876,010 discloses an apparatus which is connected to a revolving arm for cleaning a sewage treatment tank. The apparatus has a series of nozzles, a skimmer blade, a first brush supported on a first arm for cleaning the exterior surface of a circular barrier and a pair of articulated arms which are positioned on each side of a hexagonal effluent channel which is U-shaped in cross section with the upstanding portions defining an inner and outer weir A brush is connected to each articulated arm for cleaning only the exterior surface of the inner weir and only the exterior surface of the outer weir, respectively.

Hall, U.S. Pat. No. 4,830,748 discloses an apparatus which is connected to a revolving skimmer blade for cleaning algae and other debris from a round water treatment tank. The apparatus has a first set of three cleaning brushes which clean the inside and outside surfaces of the baffle and the inside surface of the weir. The brush for cleaning the inside surface of the baffle is mounted on its own support arm. A coil spring is provided between the support arm and main frame member to urge the cleaning brush into positive engagement with the inside surface of the baffle wall. The brushes for cleaning the outside surface of the baffle and the inside surface of the weir are mounted on a second support arm and face outwardly in opposite directions. These brushes are pivotally mounted on the base of the second support arm and are urged by a spring into substantially vertical alignment when placed in the operative cleaning position.

Hall, U.S. Pat. No. 4,978,447 discloses a self-propelled motorized carriage apparatus for cleaning algae and other debris from a round water treatment tank. The carriage apparatus has four wheels, two of which ride on the spillway, and the other two are supported in a C-shaped guide track channel installed on the inner wall of the clean water flow channel. Alternatively, the guide track channel can be eliminated by providing carriage apparatus with two wheels which ride on the spillway, and two wheels which are supported on the top surface of the spillway, and pinch rollers which are engaged on both sides of the weir and/or baffle. The apparatus has a first set of three cleaning brushes which clean the inside and outside surfaces of the baffle and the inside surface of the weir, a second set of brushes for cleaning the spillway, and a third set of brushes for cleaning the bottom and opposed side surfaces of the clean water flow channel.

The present invention is distinguished over the prior art in general, and these patents in particular by an apparatus for cleaning algae and debris from the weir, baffle, spillway, and effluent trough surfaces of a sedimentation water treatment tank. A main frame is mounted on the revolving skimmer arm of the tank. A pair of weir cleaning brushes mounted at a lower end of an articulated link arm assembly have bristles facing in inwardly opposed relation engage and clean both sides of the weir and move inward and outward relative to the center of rotation to compensate for out-of-round circular weir surfaces and pivot when their lower ends engage a bracket or obstruction so that they pass thereover and return to a vertical position. A sweeper connected with the weir cleaning brushes spans the space between the baffle and the weir and has elongate flexible strips that dislodge algae and debris and facilitate is passage through the weir and may also clean the surfaces of the baffle and weir. A vertical spillway cleaning brush and a vertical peripheral wall cleaning brush connected at the lower ends of respective support arms engage and clean the outer surface of the spillway and the inner surface of the peripheral wall and move in a horizontal inward and outward direction relative to the center of rotation of the skimmer arm to compensate for out-of-round and imperfect circular wall surfaces and pivot about a vertical axis should they contact an obstruction and then return the engaged position after passing over the obstruction.

SUMMARY OF THE INVENTION

It is therefore an object of the present invention to provide an apparatus and method for effectively cleaning algae and debris from the weir, baffle, spillway, and effluent trough surfaces of a sedimentation water treatment tank.

It is another object of this invention to provide a cleaning apparatus which is quickly and easily installed on the existing revolving arm of a water treatment tank which carries the skimmer blade.

Another object of this invention is to provide a cleaning apparatus which will effectively clean both the inner and outer surfaces of the weir of a water treatment tank, including weirs which may not be perfectly circular.

Another object of this invention is to provide a cleaning apparatus which will effectively clean both the inner and outer surfaces of the baffle of a water treatment tank, including baffles which may not be perfectly circular.

Another object of this invention is to provide a cleaning apparatus which will effectively sweep the space between the baffle and the weir of a water treatment tank to facilitate is passage through the weir.

Another object of this invention is to provide a cleaning apparatus which will significantly reduce algae and foreign matter from building up in the notches of the weir of a water treatment tank.

Another object of this invention is to provide a cleaning apparatus which will effectively clean the outer surfaces of a spillway and the inner surfaces of a peripheral wall and sweep the bottom of the effluent trough of a water treatment tank.

Another object of this invention is to provide a cleaning apparatus which will conform to imperfect circular weir, baffle, spillway, and effluent trough surfaces and surface irregularities, and pass over support brackets and obstructions as it revolves around a generally circular water treatment tank.

A further object of this invention is to provide a weir cleaning apparatus which is fully adjustable to compensate for a large range distances between the weir and irregular circular surfaces of various water treatment tanks.

A still further object of this invention is to provide a weir cleaning apparatus which is simple in construction economical to manufacture, and reliable in operation.

Other objects of the invention will become apparent from time to time throughout the specification and claims as hereinafter related.

The above noted objects and other objects of the invention are accomplished by an apparatus for cleaning algae and debris from the weir, baffle, spillway, and effluent trough surfaces of a sedimentation water treatment tank. A main frame is mounted on the revolving skimmer arm of the tank. A pair of weir cleaning brushes mounted at a lower end of an articulated link arm assembly have bristles facing in inwardly opposed relation engage and clean both sides of the weir and move inward and outward relative to the center of rotation to compensate for out-of-round circular weir surfaces and pivot when their lower ends engage a bracket or obstruction so that they pass thereover and return to a vertical position. A sweeper connected with the weir cleaning brushes spans the space between the baffle and the weir and has elongate flexible strips that dislodge algae and debris and facilitate is passage through the weir and may also clean the surfaces of the baffle and weir. A vertical spillway cleaning brush and a vertical peripheral wall cleaning brush connected at the lower ends of respective support arms engage and clean the outer surface of the spillway and the inner surface of the peripheral wall and move in a horizontal inward and outward direction relative to the center of rotation of the skimmer arm to compensate for out-of-round and imperfect: circular wall surfaces and pivot about a vertical axis should they contact an obstruction and then return the engaged position after passing over the obstruction.

DESCRIPTION OF THE PREFERRED EMBODIMENT

Figure 1:
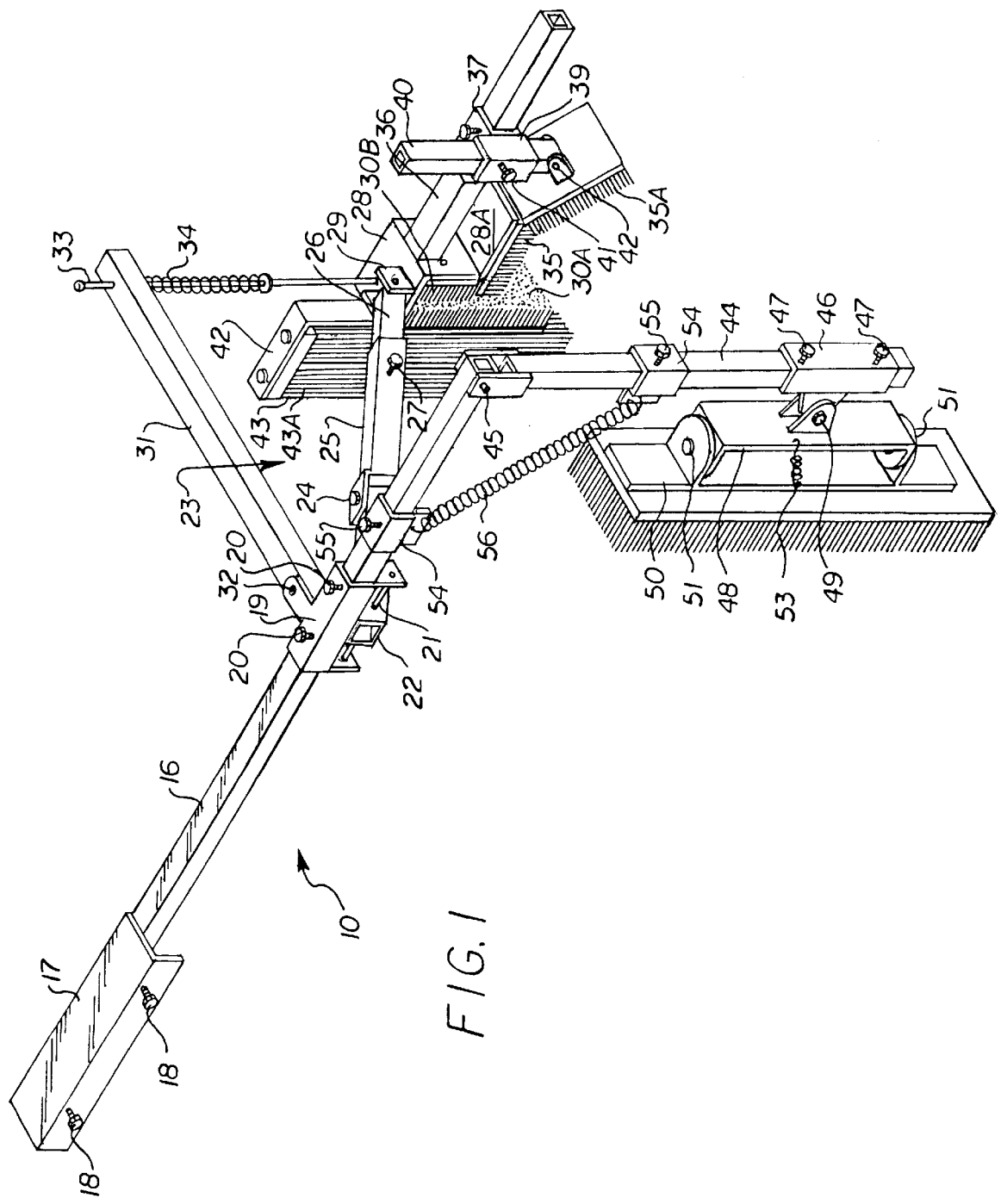
FIG. 1 is a perspective view of the cleaning apparatus in accordance with the present invention.
Figure 2:
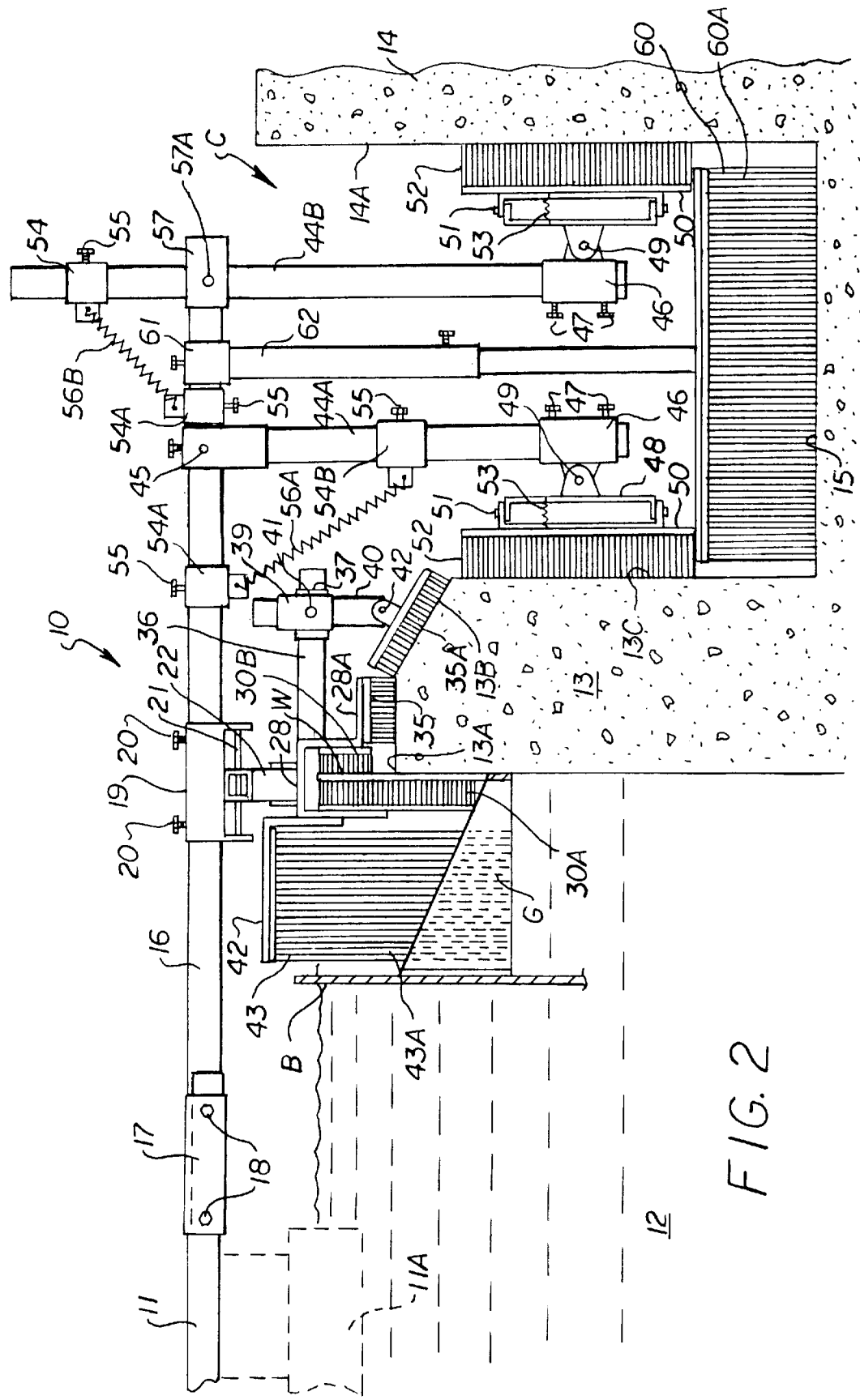
FIG. 2 is an elevational view of the cleaning apparatus of the present invention shown installed on the skimmer arm of a water treatment tank with its brushes engaged on the weir and the top surface and outer wall of the spillway, the inner surface of the peripheral wall, a first sweeper member positioned in the space between the baffle and the weir and a second sweeper member positioned in the effluent trough.

Referring to the drawings by numerals of reference, there is shown in FIGS. 1 and 2, a preferred weir cleaning apparatus 10 which is adapted to be installed on the skimmer arm of a sedimentation water treatment tank. FIG. 2 shows the apparatus 10 installed on the existing skimmer arm 11 of a conventional water treatment tank.

In most installations, clean water is displaced from the tank by the constant flow of heavier sediment containing water into the tank. The typical water treatment tank has a central influent 12 surrounded by a circular vertical spillway wall 13 and a radially spaced outer vertical peripheral wall 14 joined by a bottom wall 15 defining a clean water flow channel C or launder channel. The spillway wall 13 has a top surface 13A and may have an outwardly and downwardly angled surface 13B. A generally circular vertical weir W having inner and outer surfaces is secured to the inner facing surface of the spillway wall and its upper portion extends a distance above the top surface of the spillway wall. The typical weir W has a V-notched upper portion. A generally circular vertical baffle plate B having inner and outer surfaces is spaced radially inward a distance from the weir W. In the illustrated example, the baffle B is joined to the spillway 13 by triangular gussets G.

The displaced clean water flows under the circular baffle plate B which collects floating scum and then over the radially spaced circular weir W supported on the spillway wall 13, and enters the circular effluent clean water flow channel C launder channel which directs the water to the next treatment stage where it is further made safe to be discharged into a river or stream. The elongate skimmer arm 11 has a depending skimmer blade 11A and revolves around the influent portion of the circular tank to provide churning and direct floating debris to a drain.

The cleaning apparatus 10 has a tubular main frame 16 which is installed on the outer end of the existing skimmer arm 11 that carries the skimmer blade 11A and the apparatus 10 is driven around the tank by the skimmer arm. A mounting bracket 17 at the inner end of the main frame 16 is received on the outer end of the skimmer arm 11 and is secured thereon by set bolts 18. The mounting bracket 17 allows quick and easy installation and adjustable positioning of the main frame 16 along the longitudinal axis of the skimmer arm 11. The outer end of the main frame 16 extends outwardly over the baffle plate B and the weir W to a position above the outer surface of the spillway 13.

A link arm mounting collar 19 is slidably received on the main frame 16 and is secured thereon by set bolts 20. The set bolts 20 allow the collar 19 to be adjustably positioned along the longitudinal axis of the main frame 16 above the weir W. The collar 19 has a pair of ears on its underside with a rod 21 extending horizontally therebetween. One end of a tubular upper member 22 of an articulated link arm assembly 23 is slidably and pivotally mounted on the horizontal rod 21 to slide inward and outward relative to the center of rotation of the skimmer arm and pivot about a horizontal axis. The opposed end of the upper member 22 is pivotally connected by a vertical pivot pin 24 to an intermediate tubular member 25. One end of a lower tubular member 26 is slidably received inside the open end of the intermediate tubular member 25 and is secured therein by a set bolt 27. The set bolt 27 allows the longitudinal length of the link arm assembly 23 to be adjusted.

An inverted, generally U-shaped weir brush bracket 28 is pivotally connected to the lower end of the lower member 26 of the articulated link arm assembly 23 by a horizontal pivot connection 29. A pair of brushes 30A and 30B are mounted vertically on the inner sides of the bracket 28 with their bristles facing in laterally opposed relation to be received and engaged one on each side of the weir W for cleaning both surfaces of the weir. In other words, the brushes 30A and 30: straddle the weir W and clean the inner and outer surfaces simultaneously with substantially equal force on both surfaces. This arrangement also allows the brushes 30A and 30B to dislodge algae and foreign matter which may have been built up in the notches of the weir W. The horizontal pivot pin connection 29 allows the bracket 28 and brushes 30A and 30B to trail behind the main frame 16 in a generally vertical orientation.

One end of a tubular upper link arm 31 is pivotally connected to the collar 19 by a vertical pivot pin connection 32 and pivots in a horizontal plane. An elongate headed vertical pin 33 extends slidably through a hole in the outer end of the upper link arm 31 and its lower end is connected to the top of the inverted U-shaped weir brush bracket 28. A compression spring 34 is received on the pin 31 and has its top end engaged on the underside of the arm 31 and its bottom end engaged on a washer secured to the pin a distance above the weir brush support bracket 28. The compression spring 34 exerts a positive downward force between the upper link arm 31 and the weir brush bracket 28 to bias it normally downward to maintain engagement of the brushes 30A and 30B with the weir surfaces, but allows the bracket to ride a short distance vertically upwardly against the spring force if the weir brushes contact an obstruction along the lower portion of the weir.

It should be noted that the upper link arm 32 and the articulated link arm assembly 23 allow the weir brushes 30A and 30B to move horizontally inward and outward in relation to the center of rotation of the skimmer arm to maintain both brushes engaged on the respective inner and outer surfaces of the circular weir W as the skimmer arm revolves around the circular tank. Not all weirs are perfectly circular and, in a single tank, there may be wide variations in the radial distance from the center of the tank to the surface of the weir. This horizontally inward and outward movement of the weir brushes in relation to the center of rotation of the skimmer arm compensates for "out-of-round" weirs and irregular movement of the skimmer arm and maintains the weir brushes in constant engagement with the weir as they are guided along the weir.

The inverted U-shaped weir brush bracket 28 may also be provided with rectangular extension 28A extending outwardly from the outer side of the bracket. A brush 35 is secured to the underside of the extension 28A with its bristles facing downwardly therefrom to engage the top surface 13A of the spillway 13 adjacent the outer surface of the weir W.

For cleaning an angular surface 13B of the spillway 13, the U-shaped bracket 28 may be provided with an outwardly extending tubular extension 36 having a horizontal collar 37 slidably mounted thereon and secured with a set bolt 38. A vertical collar 39 is secured to the horizontal collar 37 and a vertical tubular member 40 is slidably received through the vertical collar and secured with a set bolt 41. A brush 35A is pivotally connected to the bottom end of the vertical tubular member 40 by a pivot connection 42 to allow the brush to pivot about a horizontal axis. Thus, the brush 35A may be adjustably positioned vertically and inwardly or outwardly relative to the weir cleaning brushes 30A and 30B to properly engage and clean the angled surface 13B and will pivot to compensate for irregularities in the angular surface. It should be understood that the brush 41 may also be positioned to clean horizontal or vertical wall surfaces.

For cleaning the space between the circular weir W and the circular baffle B, the U-shaped weir brush bracket 28 may be provided with an inwardly extending inverted L-shaped bracket 42 having a horizontal leg that extends over at least a portion of the space between the baffle B and the weir W. A generally rectangular sweeper 43 is secured to the horizontal leg of the bracket 28. The sweeper 43 may be formed of a plurality of elongate strips 43A of flexible material such as a foam rubber, similar to the flexible brushes used in some car wash machines, or elongate strands or bristles of stiffer but flexible material similar to a broom. The elongate flexible strips 43A or bristles of the sweeper 43 extend downwardly beneath the surface of the water in the space between the baffle B and weir W. The elongate strips 63A are sufficiently flexible to ride over gussets G, brackets and other obstructions then return to their vertical orientation as the sweeper passes through the water space between the baffle and weir.

The sweeper 43 may be dimensioned such that its strips 43A or bristles do not touch the sides of the baffle B or weir W, but extend into the water in the space between the baffle and weir to sweep and facilitate passage of algae and debris floating in the water space through the weir as it is pulled therethrough by the skimmer arm.

The sweeper 43 may also be dimensioned such that a substantial portion of its flexible strips 43A or bristles engage and sweep the inner surface of the weir W and the outer surface of the baffle B to dislodge algae and debris from the surfaces and facilitate passage of the loosened algae and debris floating in the water space through the weir as it is pulled therethrough by the skimmer arm.

The sweeper 43 may also be dimensioned to span the space between the baffle B and weir W such that a substantial portion of its flexible strips 43A or bristles straddle and engage the inner and outer surfaces of the baffle B and the inner and outer surfaces of the weir W to dislodge algae and debris therefrom as the sweeper passes over the baffle and weir.

For cleaning the outer side wall surface 13C of the spillway 13, a side wall brush support arm 44 is pivotally mounted at its upper end at the outer end of the main frame 16 by a pivot pin connection 45. A brush mounting collar 46 is slidably received on the lower end of the support arm 44 and is secured thereon by set bolts 47. The set bolts 47 allow the collar 46 to be adjustably positioned along the longitudinal axis of the support arm 44.

A rectangular U-shaped brush bracket 48 is pivotally connected to the collar 46 by a pivot pin connection 49. A second rectangular brush bracket 50 with ears is pivotally connected to the top and bottom horizontal ends of the bracket 48 by a pair of pivot pin connections 51. A brush 52 is secured to the bracket 50. The connection 49 allows the brush 52 and second bracket 50 to pivot about a horizontal axis and the connections 51 allow the brush to pivot about a vertical axis. A tension spring 53 is connected between one side of the rectangular U-shaped bracket 48 and one side of the bracket 50 on the sides that are in the direction of travel to normally maintain the bristles of the brush 52 engaged against the outer surface 13C of the spillway 13, but allow the brush pivot about a vertical axis should it contact an obstruction and then return it to the engaged position after passing over the obstruction.

A first spring mounting collar 54 is slidably received on the support arm 44 intermediate the upper pivotal connection 45 and the brush mounting collar 46 and is secured thereon by a set bolt 55. The set bolt 55 allows the collar 54 to be adjustably positioned along the longitudinal axis of the support arm 44. A second spring mounting collar 54 is slidably received on the main frame 16 inwardly of the outer pivotal connection 45 and is secured thereon by a set bolt 55. The set bolt 55 allows the collar 54 to be adjustably positioned along the longitudinal axis of the main frame 16. A tension spring 56 has one end secured to the first and second spring mounting collars 54 and extends generally diagonally therebetween beneath the main frame 16.

The spring 56 applies a tension force between the main frame 16 and the support arm 44 to spring bias the brush 52 into firm engagement with the outer surface 13C of the spillway 13 and allows it to travel in and out relative to the center of rotation of the skimmer arm 11. The pivotal connections 49 and 51 of the brush 52 allow it accommodate surface irregularities. The adjustable first and second spring mounting collars 54 allow the amount of brush engagement force to be varied and allows the spring 56 to be positioned to clear any obstructions. The brush 52 cleans the exterior side wall 13C of the spillway 13 and also provides churning of the water in the clean water channel C.

FIG. 2 shows a modification of the cleaning apparatus 10 for cleaning both the outer surface 13C of the spillway wall 13 and the radially spaced inner surface 14A of the peripheral outer wall 14 of the effluent clean water flow channel C or launder channel. In this modification, a pair of first spring mounting collars 54A are slidaby mounted on the main frame 16 and secured in longitudinally spaced relation by set bolts 55. The outer end of the main frame 16 is provided with a yoke 57. A first side wall brush support arm 44A is pivotally connected at its upper end to the main frame 16 by a pivot pin connection 45A. A second longer side wall brush support arm 44B is pivotally connected intermediate its top and bottom ends to the yoke 57 by a pivot pin connection 57A.

A second pair of spring mounting collars 54B are slidably received one on the lower end of the support arm 44A and the other on the upper end of the support arm 44B and are secured thereon by set bolts 55. The opposed ends of a first tension spring 56B are secured to the first pair of spring mounting collars 54A and 54B and extends generally diagonally therebetween beneath the main frame 16. The opposed ends of a second tension spring 56B are secured to the second pair of spring mounting collars 54A and 54B, and extends generally diagonally therebetween above the main frame 16.

The lower ends of the brush support arms 44A and 44B are provided with the same brush mounting collars 46, brackets 48,50, brushes 52, and brush tension springs 53, as previously described above with reference to FIG. 1, and are given the same reference numerals, but will not be described again in detail to avoid repetition. It should be noted that the brushes 52 are mounted such that their bristles are facing in outwardly opposed relation to engage and clean both the outer surface 13C of the spillway wall 13 and the radially spaced inner surface 14A of the peripheral outer wall 14 of the effluent clean water flow channel C or launder channel.

As shown in FIG. 2, the cleaning apparatus 10 may also be provided with a second sweeper 60 for cleaning the bottom wall 15 of the clean water flow channel C. A collar 61 is slidably received on the main frame 16 and outwardly from the pivotal brush connection 45A. A telescoping sweeper support arm 62 is rigidly secured to the collar 61 at its upper end and extends downwardly therefrom terminating a predetermined distance above the bottom wall 15. The lower end of the support arm 62 is provided with a sweeper 60, similar to the one described previously, but somewhat shorter. The elongate flexible strips 60A or bristles of the sweeper 60 extend downwardly to engage the bottom wall 15 and sweep and dislodge algae and debris therefrom as it is pulled through the clean water flow channel C by the skimmer arm. It should be noted that the sweeper 60 is not biased downwardly by spring pressure thus it will not be forced downwardly through openings or drains in the bottom wall 15 and does not require openings or drains to be covered by grates.

While this invention has been described fully and completely with special emphasis upon preferred embodiments, it should be understood that within the scope of the appended claims the invention may be practiced otherwise than as specifically described herein.

I claim:

1. An apparatus for cleaning algae and other debris from the surfaces of a round water treatment tank of the type having a central influent, a revolving skimmer arm, a generally circular baffle with inner and outer surfaces, a generally circular weir with inner and outer surfaces supported on a spillway radially spaced from said baffle, and a peripheral wall radially spaced from said spillway defining a bottom wall and clean water flow channel therebetween, the apparatus comprising:

frame means mounted on said revolving skimmer arm and driven around the full circumference of said generally circular weir by said skimmer arm;

articulated link arm means pivotally connected at one end with said frame means to pivot in a vertical plane relative thereto and to move in a horizontal inward and outward direction in relation to the center of rotation of said skimmer arm to compensate for out-of-round and imperfect circular weir surfaces;

a pair of weir cleaning brushes pivotally mounted at a second end of said articulated link arm means and disposed in a generally vertical orientation with their bristles facing each other in laterally opposed relation to be received and engaged one on each side of said weir for cleaning said inner and outer surfaces of said weir;

resilient means connected with said link arm means and said weir cleaning brushes for biasing said pair of brushes into a substantially vertical orientation and to allow pivotal movement thereof when a lower end of either one of said pair of brushes engages a bracket or obstruction so that said pair of brushes will pass over said bracket or obstruction and are then returned to the biased substantially vertical orientation; and a generally rectangular sweeper connected with said weir cleaning brushes to move therewith and extending over at least a portion of the space between said baffle and said weir and having a plurality of elongate vertical strips of flexible material extending into the water in the space between said baffle and said weir to sweep and facilitate passage of algae and debris floating in the water space through said weir as it is pulled therethrough by said skimmer arm.

2. The apparatus set forth in claim 1, wherein said generally circular baffle is supported in radially spaced relation to said weir and said spillway by circumferentially spaced gussets extending transversely therebetween; and said elongate vertical strips of said sweeper are sufficiently flexible to pass over said gussets and then return to their vertical orientation as said sweeper passes through the water space between said baffle and said weir.

3. The apparatus set forth in claim 1, wherein said sweeper is dimensioned to span the space between said baffle and said weir such that a portion of said plurality of elongate vertical strips engage said baffle outer surface and said weir inner surface to dislodge algae and debris therefrom as said sweeper passes over said space between said baffle and said weir.

4. The apparatus set forth in claim 1, wherein said sweeper is dimensioned to span the space between said baffle and said weir such that a portion of said plurality of elongate vertical strips engage said baffle inner and outer surfaces and said weir inner and outer surfaces to dislodge algae and debris therefrom as said sweeper passes over said space between said baffle and said weir.

5. The apparatus set forth in claim 1, further comprising a top cleaning brush connected with said pair of weir cleaning brushes positioned relative thereto for cleaning a top surface of said spillway adjacent said outer surface of said weir.

6. The apparatus set forth in claim 1, further comprising a pivotal angular surface cleaning brush connected with said pair of weir brushes adjustably positioned vertically and inwardly and outwardly relative thereto for cleaning an outwardly and downwardly angled surface of said spillway adjacent said weir.

7. The apparatus set forth in claim 1, further comprising spillway cleaning means for cleaning an outer surface of said spillway.

8. The apparatus set forth in claim 7, wherein said spillway cleaning means includes a support arm pivotally connected at an upper end with said frame means to pivot in a vertical plane relative thereto and for movement in a horizontal inward and outward direction in relation to the center of rotation of said skimmer arm to compensate for out-of-round and imperfect circular outer surfaces of said spillway; and a spillway cleaning brush pivotally mounted at a lower end of said support arm with its bristles facing said spillway to be received and engaged on said outer surface of said spillway for cleaning said outer surface.

9. The apparatus set forth in claim 8, wherein said spillway cleaning brush is disposed in a generally vertical orientation and pivotally mounted to said lower end of said support arm to pivot about a vertical axis and a horizontal axis to compensate for angular and surface irregularities in said outer surface; and resilient means connected with said support arm and said spillway cleaning brush to bias said lower end of said support arm inwardly and said spillway cleaning brush against said outside surface of said spillway in a substantially vertical orientation such that said spillway cleaning brush is maintained in biased engagement with said outer surface but is allowed to move in a horizontal inward and outward direction in relation to the center of rotation of said skimmer arm to compensate for out-of-round and imperfect circular outer surfaces of said spillway, and to allow said spillway cleaning brush to pivot about a vertical axis should it contact an obstruction and then return it to the engaged position after passing over the obstruction.

10. The apparatus set forth in claim 1, further comprising peripheral wall cleaning means for cleaning an inner surface of said peripheral wall.

11. The apparatus set forth in claim 10, wherein said peripheral wall cleaning means includes a support arm pivotally connected at an upper end with said frame means to pivot in a vertical plane relative thereto and for movement in a horizontal inward and outward direction in relation to the center of rotation of said skimmer arm to compensate for out-of-round and imperfect circular inner surfaces of said peripheral wall;

a peripheral wall cleaning brush pivotally mounted at a lower end of said support arm with its bristles facing said peripheral wall to be received and engaged on said inner surface of said peripheral wall for cleaning said inner surface.

12. The apparatus set forth in claim 11, wherein said peripheral wall cleaning brush is disposed in a generally vertical orientation and pivotally mounted to said lower end of said support arm to pivot about a vertical axis and a horizontal axis to compensate for angular and surface irregularities in said inner surface; and resilient means connected with said support arm and said peripheral wall cleaning brush to bias said lower end of said support arm outwardly and said peripheral wall cleaning brush against said inner surface of said peripheral wall in a substantially vertical orientation such that said peripheral wall cleaning brush is maintained in biased engagement with said inner surface but is allowed to move in a horizontal inward and outward direction in relation to the center of rotation of said skimmer arm to compensate for out-of-round and imperfect circular inner surfaces of said peripheral wall, and to allow said peripheral wall cleaning brush to pivot about a vertical axis should it contact an obstruction and then return it to the engaged position after passing over the obstruction.

13. The apparatus set forth in claim 1, further comprising;

a telescoping sweeper support arm having an upper end secured near an outer end of said frame means and a lower end extending downwardly therefrom secured a predetermined distance above said clean water flow channel bottom wall; and a second generally rectangular sweeper connected with said sweeper arm lower end and having a plurality of elongate vertical strips of flexible material extending into engagement with said bottom wall to sweep and dislodge algae and debris from said bottom wall as it is pulled therethrough by said skimmer arm.

14. An apparatus for cleaning algae and other debris from the surfaces of a round water treatment tank of the type having a central influent, a revolving skimmer arm, a generally circular spillway, and a peripheral wall radially spaced from said spillway defining a bottom wall and clean water flow channel therebetween, the apparatus comprising:

frame means mounted on said revolving skimmer arm and driven around the full circumference of said generally circular weir by said skimmer arm;

a first support arm pivotally connected at an upper end with said frame means to pivot in a vertical plane relative thereto and for movement in a horizontal inward and outward direction in relation to the center of rotation of said skimmer arm to compensate for out-of-round and imperfect circular outer surfaces of said spillway; and a spillway cleaning brush pivotally mounted at a lower end of said first support arm with its bristles facing said spillway to be received and engaged on said outer surface of said spillway for cleaning said outer surface.

15. The apparatus set forth in claim 14, wherein said spillway cleaning brush is disposed in a generally vertical orientation and pivotally mounted to said lower end of said first support arm to pivot about a vertical axis and a horizontal axis to compensate for angular and surface irregularities in said outer surface; and resilient means connected with said first support arm and said spillway cleaning brush to bias said lower end of said support arm inwardly and said spillway cleaning brush against said outside surface of said spillway in a substantially vertical orientation such that said spillway cleaning brush is maintained in biased engagement with said outer surface but is allowed to move in a horizontal inward and outward direction in relation to the center of rotation of said skimmer arm to compensate for out-of-round and imperfect circular outer surfaces of said spillway, and to allow said spillway cleaning brush to pivot about a vertical axis should it contact an obstruction and then return it to the engaged position after passing over the obstruction.

16. The apparatus set forth in claim 14, further comprising:

a second support arm pivotally connected at an upper end with said frame means to pivot in a vertical plane relative thereto and for movement in a horizontal inward and outward direction in relation to the center of rotation of said skimmer arm to compensate for out-of-round and imperfect circular inner surfaces of said peripheral wall;

a peripheral wall cleaning brush pivotally mounted at a lower end of said support arm with its bristles facing said peripheral wall to be received and engaged on said inner surface of said peripheral wall for cleaning said inner surface.

17. The apparatus set forth in claim 16, wherein said peripheral wall cleaning brush is disposed in a generally vertical orientation and pivotally mounted to said lower end of said second support arm to pivot about a vertical axis and a horizontal axis to compensate for angular and surface irregularities in said inner surface; and resilient means connected with said second support arm and said peripheral wall cleaning brush to bias said lower end of said second support arm outwardly and said peripheral wall cleaning brush against said inner surface of said peripheral wall in a substantially vertical orientation such that said peripheral wall cleaning brush is maintained in biased engagement with said inner surface but is allowed to move in a horizontal inward and outward direction in relation to the center of rotation of said skimmer arm to compensate for out-of-round and imperfect circular inner surfaces of said peripheral wall, and to allow said peripheral wall cleaning brush to pivot about a vertical axis should it contact an obstruction and then return it to the engaged position after passing over the obstruction.

18. The apparatus set forth in claim 14, further comprising;

a telescoping sweeper support arm having an upper end secured with said frame means and a lower end extending downwardly therefrom secured a predetermined distance above said clean water flow channel bottom wall; and a generally rectangular sweeper connected with said sweeper arm lower end and having a plurality of elongate vertical strips of flexible material extending into engagement with said bottom wall to sweep and dislodge algae and debris from said bottom wall as it is pulled therethrough by said skimmer arm.

* * * * *